United States Patent
Delli Paoli et al.

(10) Patent No.: US 11,577,829 B2
(45) Date of Patent: Feb. 14, 2023

(54) ANTI-TORQUE ROTOR FOR A HELICOPTER

(71) Applicant: LEONARDO S.P.A., Rome (IT)

(72) Inventors: Michele Delli Paoli, Samarate (IT); Fabio Nannoni, Samarate (IT); Roberto Vanni, Samarate (IT)

(73) Assignee: LEONARDO S.P.A., Rome (IT)

( * ) Notice: Subject to any disclaimer, the term of this patent is extended or adjusted under 35 U.S.C. 154(b) by 84 days.

(21) Appl. No.: 17/059,710

(22) PCT Filed: May 26, 2020

(86) PCT No.: PCT/IB2020/054977
§ 371 (c)(1),
(2) Date: Nov. 30, 2020

(87) PCT Pub. No.: WO2020/254894
PCT Pub. Date: Dec. 24, 2020

(65) Prior Publication Data
US 2021/0261244 A1   Aug. 26, 2021

(30) Foreign Application Priority Data
Jun. 17, 2019   (EP) .................................... 19180441

(51) Int. Cl.
*B64C 27/82*   (2006.01)
*B64C 27/605*   (2006.01)

(52) U.S. Cl.
CPC ............ *B64C 27/82* (2013.01); *B64C 27/605* (2013.01)

(58) Field of Classification Search
CPC ... B64C 27/12; B64C 2027/125; B64C 27/00; B64C 27/006; B64C 27/04; B64C 27/06; B64C 27/35
See application file for complete search history.

(56) References Cited

U.S. PATENT DOCUMENTS

| | | | | |
|---|---|---|---|---|
| 3,183,043 A | * | 5/1965 | Creeger | H02K 5/1732 384/624 |
| 3,508,241 A | * | 4/1970 | Milton | F16C 19/52 340/682 |

(Continued)

FOREIGN PATENT DOCUMENTS

| | | | | |
|---|---|---|---|---|
| EP | 2982604 A1 | * | 2/2016 | B64C 11/44 |
| EP | 3 216 696 | | 9/2017 | |

(Continued)

*Primary Examiner* — Joshua J Michener
*Assistant Examiner* — Cindi M Curry
(74) *Attorney, Agent, or Firm* — Leason Ellis LLP

(57) ABSTRACT

An anti-torque rotor is described for a helicopter, comprising: a mast rotatable about a first axis; a plurality of blades hinged on the mast, extending along respective second axes transversal to said first axis and rotatable about respective said second axes to alter the respective angles of attack; a control element sliding and rotating with respect to the mast, and operatively connected to said blades to cause the rotation of said blades about respective second axes following a translation of said element along the first axis; a control rod sliding axially along first axis with respect to the mast and angularly fixed with respect to the first axis; and a bearing interposed between the control rod and the control element, sliding along the first axis with respect to the mast and integrally with the control rod; the anti-torque rotor further comprises an interface made of an antifriction material interposed between said control rod and said bearing.

16 Claims, 6 Drawing Sheets

(56) References Cited

U.S. PATENT DOCUMENTS

| | | | | |
|---|---|---|---|---|
| 4,058,353 A * | 11/1977 | Frommlet | ............. | B64C 27/605 384/624 |
| 5,407,386 A * | 4/1995 | Kish | ....................... | B64C 27/12 464/99 |
| 9,359,073 B2 * | 6/2016 | Hewitt | .................... | F16C 19/54 |
| 2007/0009194 A1 * | 1/2007 | Schelbert | ................ | F16C 21/00 384/537 |
| 2017/0253328 A1 * | 9/2017 | Wang | ...................... | B64C 27/78 |

FOREIGN PATENT DOCUMENTS

| | | |
|---|---|---|
| FR | 3 021 374 | 11/2015 |
| WO | WO 93/02916 | 2/1993 |

\* cited by examiner

ANTI-TORQUE ROTOR FOR A HELICOPTER

CROSS-REFERENCE TO RELATED APPLICATIONS

This patent application is a U.S. National Phase Application under 35 U.S.C. § 371 of International Patent Application No. PCT/IB2020/054977, filed on May 26, 2020, which claims priority from European patent application no. 19180441.8 filed on Jun. 17, 2019, all of which are by reference, as if expressly set forth in their respective entireties herein.

TECHNICAL FIELD

The present invention relates to an anti-torque rotor for a helicopter.

BACKGROUND ART

Helicopters are known to basically comprise a fuselage, a main rotor positioned on the top of the fuselage and rotating about an axis of its own, and an anti-torque rotor located at the tail end of the fuselage.

Helicopters also comprise, in a known manner, one or more power units, such as turbines for example, and a transmission unit interposed between the turbines and the main rotor adapted to transmit motive power from the turbines to the main rotor.

In greater detail, the anti-torque rotor, in turn, basically comprises:
a mast rotatable about a first axis;
a hub rotatable about the first axis; and
a plurality of blades hinged on said hub, projecting in a cantilever fashion from the hub and each extending along respective second axes transversal to the first axis.

The mast of the anti-torque rotor is driven in rotation by a set of gears driven by the main transmission unit.

The blades of the anti-torque rotor rotate integrally with the mast about the first axis and can be selectively tilted about the second axis, so as to be able to alter the respective angles of attack and consequently adjust the thrust exerted by the anti-torque rotor.

In order to adjust the angles of attack of the respective blades, anti-torque rotors comprise:
a rod, operatively connected to a pedal operable by the pilot through a mechanical connection or fly-by-wire link and sliding inside the mast along the first axis, but angularly fixed with respect to the first axis;
a control element, also known as a "spider", integrally rotating with the mast about the first axis and equipped with a plurality of arms connected to respective blades in an eccentric position with respect to the associated second axes; and
an antifriction bearing, mounted in a sliding manner with respect to first axis, interposed between the rod and control element, and configured so as to transmit an axial load from the rod to the control element.

More specifically, the antifriction bearing, in turn, comprises:
a radially outer ring fastened on the control element;
a radially inner ring fastened to the control rod; and
a plurality of rolling bodies, which roll in respective raceways defined by the radially inner and outer rings.

In a normal operating condition of the bearing, the rolling bodies allow rotation of the outer ring with respect to the inner ring and the consequent rotation of the control element with respect to the rod.

Operation of the pedal causes the control rod to slide parallel to the first axis. This sliding causes, via the antifriction bearing, the control element to slide parallel to the first axis along a given path of travel.

This sliding causes rotation of the blades about the associated second axes, so as to alter the respective angles of attack by equal amounts associated with the given path of travel.

From the foregoing, it follows that a possible failure of the antifriction bearing would risk making the anti-torque rotor effectively uncontrollable, causing a hazardous situation for the helicopter.

In particular, a first failure situation might occur in the case where rolling bodies and/or the raceways of the inner or outer rings become damaged, for example due to the accidental introduction of foreign bodies inside the bearing, the loss of lubricating grease, or damage to the raceways or surfaces of the rolling bodies.

In this condition, instead of allowing the relative rotation of the control element to the control rod, the antifriction bearing would improperly transfer a twisting moment, progressively growing over time, from the outer ring to the inner ring.

This twisting moment would be transmitted to the control rod, generating a risk of damaging the control rod.

Regarding this first failure situation, there is awareness in the industry of the need to reduce the risk that these twisting moments could irreversibly damage the control rod.

A second failure situation might occur in the case where the rolling bodies break with consequent detachment of the inner ring from the rolling bodies. In this case, the bearing would no longer be slidable parallel to the first axis, and the rod would no longer cause translation of the control element.

There is awareness in the industry of the need to promptly detect the failure state of the antifriction bearing, so that the pilot can quickly land before the helicopter becomes completely uncontrollable.

There is also awareness in the industry of the need to ensure correct control of the anti-torque rotor, even in the event of failure of the antifriction bearing.

U.S. Pat. No. 9,359,073 describes an anti-torque rotor.

In greater detail, U.S. Pat. No. 9,359,073 describes an anti-torque rotor comprising a mast, a rod, and a first and second bearing arranged in series.

The first bearing comprises a first ring rotating with the mast and a second ring.

The second bearing comprises a third ring and a fourth ring.

The third ring of the second bearing and the first ring of the first bearing are connected to each other in a non-rotatable manner.

The anti-torque rotor also comprises a locking device interposed between the third and the fourth ring and adapted to prevent rotation of the third ring with respect to fourth ring. This locking device comprises an element that is breakable in the case of the first bearing failure and not breakable in the case of correct operation of the first bearing.

The solution shown in U.S. Pat. No. 9,359,073 is particularly complex as it requires using two antifriction bearings and a locking device.

EP-A-3,216,696 discloses an anti-torque rotor according to the preamble of claims 1 and 10.

U.S. Pat. No. 5,407,386 discloses a fail safe, segmented drive shaft system includes a segment support assembly comprising a ball bearing, for primary rotation, disposed within a journal bearing, for secondary rotation, which is disposed within an elastomeric damper that has a vibration probe placed in it for failure detection, and a coupling assembly comprising a flexible diaphragm for primary, flexible coupling between segments and gear teeth which engage for secondary coupling upon failure of the diaphragm. The teeth are not concentric with the rotational axis, so vibration indicates failure of the primary flexible coupling.

DISCLOSURE OF INVENTION

The object of the present invention is to provide an anti-torque rotor that enables satisfying at least one of the aforementioned needs in a simple and inexpensive manner.

The aforesaid object is achieved by the present invention, in so far as it relates to an anti-torque rotor as defined in claims 1 and 10.

BRIEF DESCRIPTION OF THE DRAWINGS

For a better understanding of the present invention, two preferred embodiments are described hereinafter, purely by way of non-limitative example and with reference to the accompanying drawings, in which.

BEST MODE FOR CARRYING OUT THE INVENTION

Figure 1:
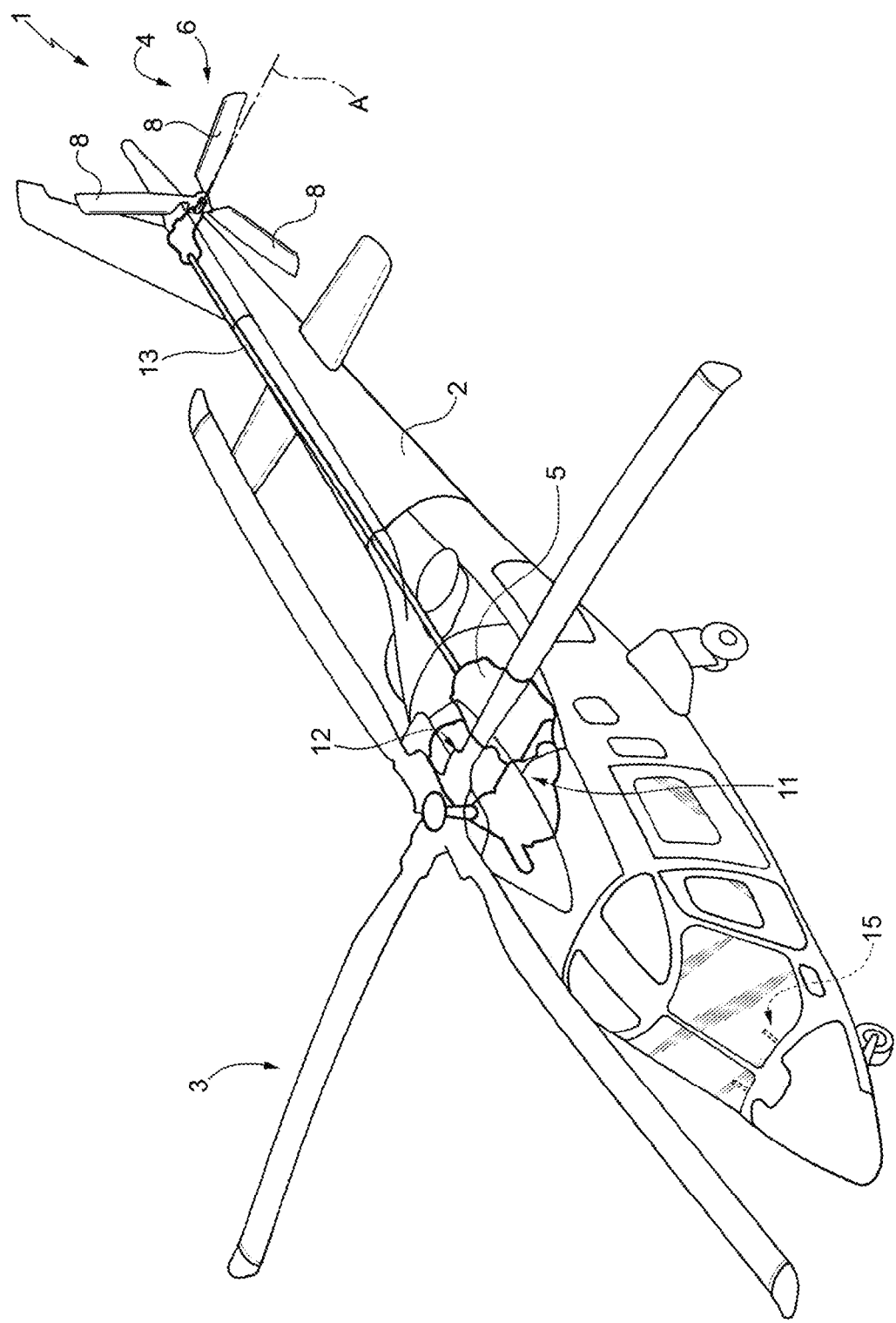
FIG. 1 is a perspective view of a helicopter comprising an anti-torque rotor according to a first embodiment of the present invention.
Figure 2:
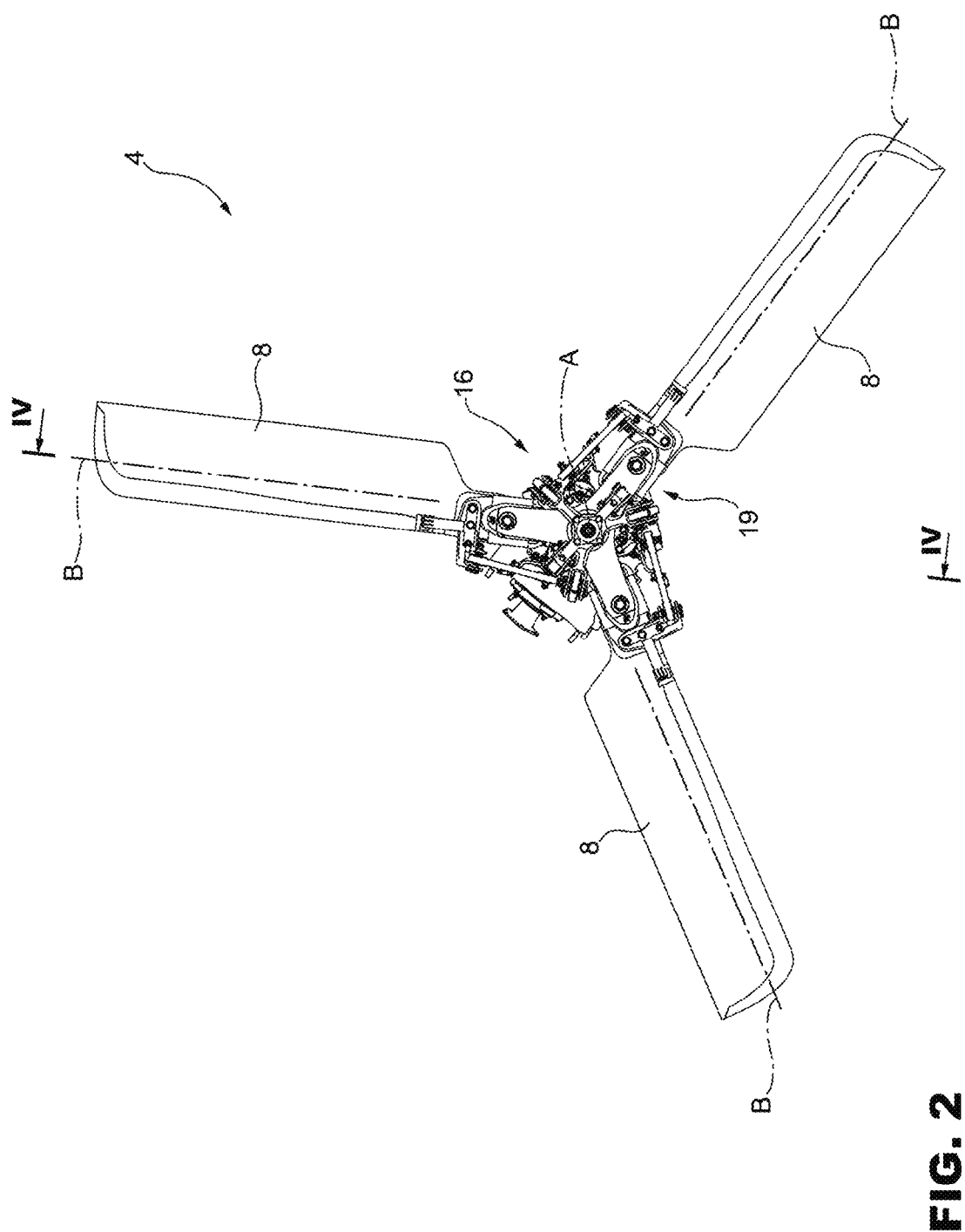
FIGS. 2 and 3 are respectively a top view and a perspective view of the anti-torque rotor in FIG. 1.
Figure 3:
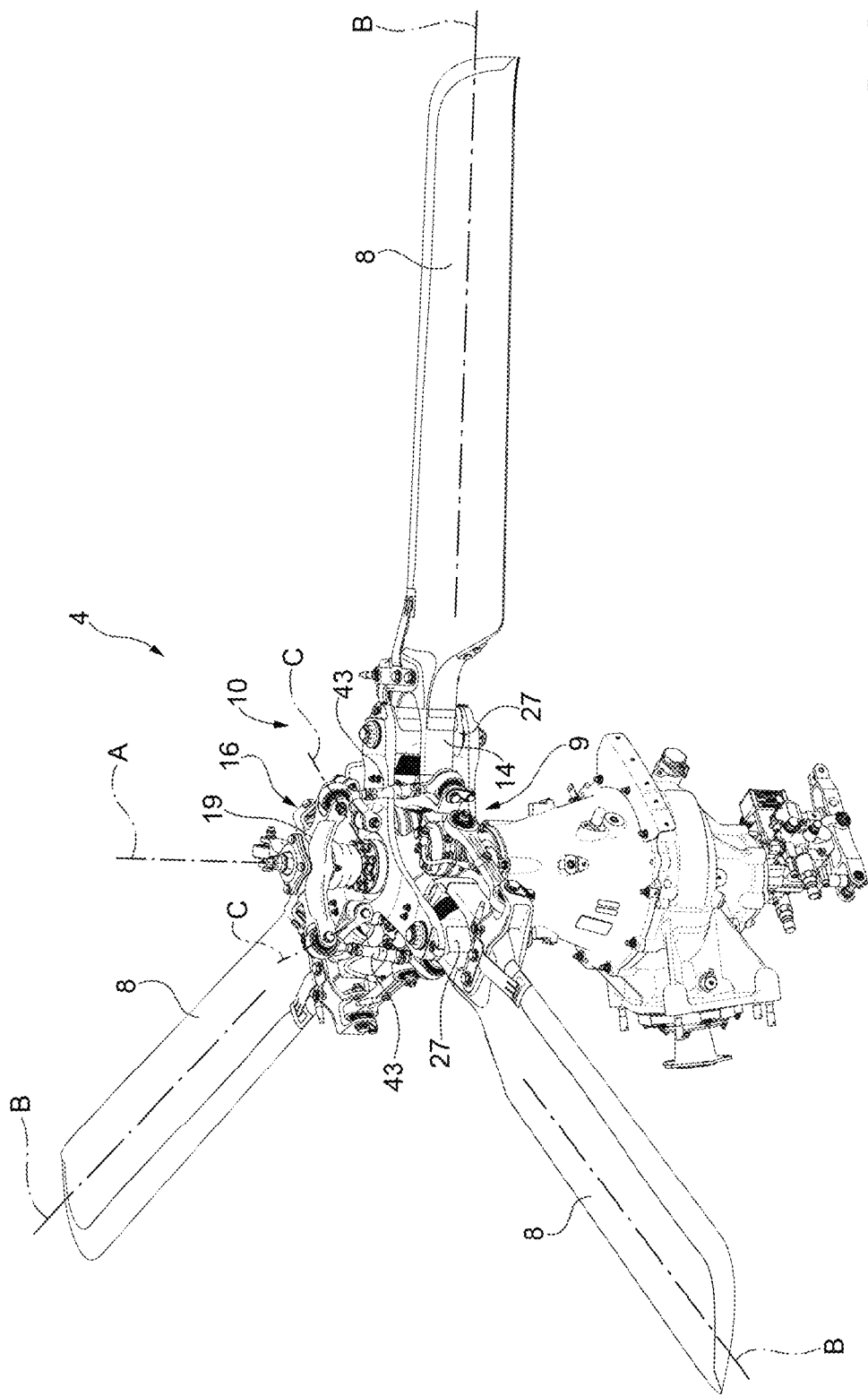
Figure 4:
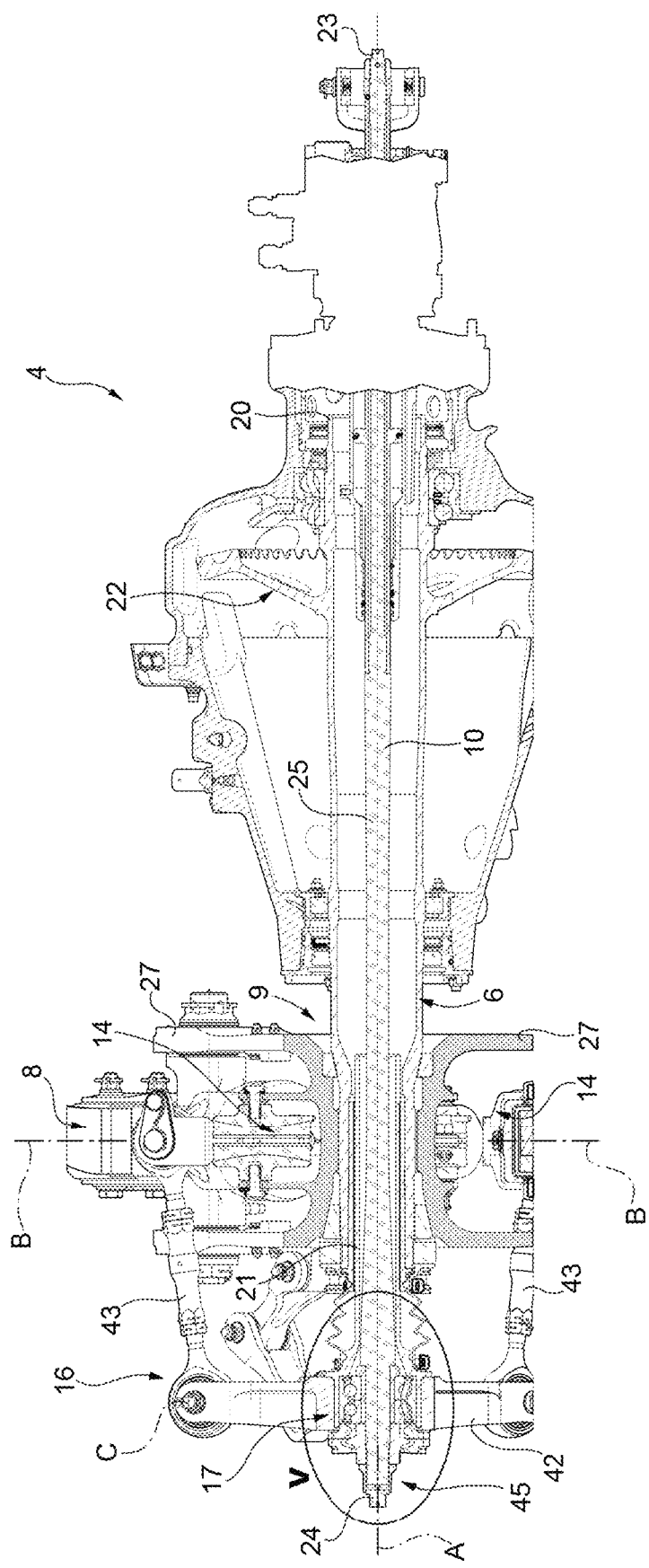
FIG. 4 is a section along the line IV-IV in FIG. 2.

Referring to FIG. 1, reference numeral 1 indicates, in particular, a helicopter basically comprising:
a fuselage 2;
one or more turbines 5;
a main rotor 3 positioned on the top of the fuselage 2 and rotatable about an axis A; and
an anti-torque rotor 4 located at a tail end of the fuselage 2 and rotatable about an axis of its own, transversal to axis A.

The helicopter 1 also comprises a main transmission unit 11, which transmits motive power from the turbines 5 to the main rotor 3.

In turn, the main transmission unit 11 comprises:
a gear train 12, which transmits motive power from the turbine 5 to the main rotor 3; and
a shaft 13, which transmits motive power from the gear train 12 to anti-torque rotor 4.

In a known manner, main rotor 3 is adapted to provide orientable thrust that enables lift-off and forward flight of the helicopter 1.

Anti-torque rotor 4 generates a thrust, which causes a counter torque on the fuselage 2.

This counter torque is directed in the opposite direction to the torque exerted by main rotor 3.

According to the amount of thrust generated by anti-torque rotor 4, it is therefore possible to orient the helicopter 1 according to a desired yaw angle, or vary said yaw angle depending on the manoeuvre that it is wished to perform.

Referring to FIGS. 2 to 5, anti-torque rotor 4 basically comprises:
a mast 6 rotatable about an axis A and operatively connected to the shaft 13 in a known manner;
a plurality of blades 8, numbering three in the case shown, which extend in a cantilever fashion along respective axes B transversal to axis A; and
a hub 9 externally fastened to a portion of the mast 6, integrally rotating with the mast 6 about axis A and on which the blades 8 are hinged.

More specifically, the blades 8 are hinged on the hub 9 so as to be:
integrally rotatable with the hub 9 and the mast 6 about axis A; and
tiltable about their respective axes B by the same angles and simultaneously in time, so as to vary the respective angles of attack.

In particular, the hub 9 comprises a plurality of connection elements 27 projecting radially with respect to axis A for connection to the respective blades 8. Each blade 8 also comprises a root portion 14 arranged radially inward with respect to axis A and hinged on the associated connection element 27 of the hub 9.

In order to vary the aforementioned angles of attack, the anti-torque rotor 4 also comprises:
a flight control 15 (only schematically shown in FIG. 1) operable by the pilot, for example a pedal;
a control rod 10 sliding parallel to axis A and operable by the flight control 15, by means of a mechanical connection or a fly-by-wire method;
a control element 16 rotating integrally with the mast 6 about axis A and connected to the blades 8 in an eccentric manner with respect to the associated axes B; and
a bearing 17 interposed between the rod 10 and the control element 16 and sliding, jointly with the rod 10, parallel to axis A.

More specifically, the mast 6 is hollow.
The mast 6 also comprises (FIGS. 4 and 5):
an axial end 20;
an axial end 21, open and opposite to end 20; and
a main portion 22 interposed between the axial ends 20 and 21 and on which the hub 9 is fitted.

The main portion 22 also defines a flange 19 adapted to receive motive power from the shaft 13.

More specifically, the mast 6 has a maximum diameter at the flange 19, and a progressively decreasing diameter proceeding from the flange 19 towards the ends 20 and 21.

The rod 10 is partly housed inside the mast 6.
The rod 10 also comprises:
an end 23;
an end 24, axially opposite to end 23; and
a main body 25 running through ends 20 and 21 of the mast 6.

Ends 23 and 24 are located externally to the mast 6 and on the sides of ends 20 and 21, respectively.

The main body 25 is operatively connected to the flight control 15 by a lever mechanism (not shown) or by a wireless control link.

Control element 16, in turn, comprises (FIG. 5):
a tubular body 40, partly housed in the mast 6 and connected to the mast 6 in a sliding manner with respect to axis A, and partly housing the rod 10;

a flange 42 extending orthogonally to axis A and fastened to the tubular body 40 on the end opposite to the mast 6; and a plurality of levers 43 (FIG. 4) hinged on flange 42 about respective axes C transversal to axis A and hinged on respective blades 8 in eccentric positions with respect to the associated axes B.

Flange 42 and the bearing 17 are housed outside the mast 6 and surround the rod 10.

More specifically, flange 42 and the bearing 17 are arranged on the end opposite to ends 20 and 23 with respect to ends 21 and 24.

Flange 42 is connected to the mast 6 by a single, variable-length bellows coupling 44, which enables sliding along the axis A.

The levers 43 are generally inclined with respect to axis A and extend from flange 42 towards ends 20 and 23.

The translation of the rod 10 along axis A causes, via the bearing 17, the translation of the control element 16.

Following the sliding of the control element 16 along axis A, the levers 43 change their inclination with respect to axis A by the same mutually identical angles, causing the simultaneous rotation of the blades 8 about their respective axes B by the same mutually equal angles.

In particular, the levers 43 are hinged on the root portions 14 of the respective blades 8.

The bearing 17 is able to transmit axial loads parallel to axis A in both directions.

In other words, the bearing 17 is configured in such a way that translation of the rod 10 along axis A in both directions causes the translation of the control element 16 in the same directions.

The bearing 17 thus defines a transmission unit, which connects the rod 10 and the control element 16 in an axially integral and angularly movable manner with respect to axis A.

The bearing 17, in turn, comprises:

an outer ring 30 integrally rotating with the control element 16;

an inner ring 31 integrally sliding with the rod 10; and a plurality of rolling bodies 32, a double ring of balls in the case shown, rolling on respective raceways 33 and 34 defined by the respective rings 31 and 32.

In the case shown, ring 31 has two shoulders 35 and 36 at mutually opposite sides, projecting radially towards ring 30 and defining respective axial abutment surfaces for the rolling bodies 32. The rolling bodies 32 are, in particular, axially interposed between the shoulders 35 and 36.

Furthermore, ring 31 is made in two half-rings, arranged axially in contact with each other in the case shown.

Ring 30 comprises a shoulder 37 axially interposed between shoulders 35 and 36, projecting radially towards ring 31 and defining respective abutment surfaces for the rolling bodies 32. Shoulder 37 is axially interposed between the rolling bodies 32 on a plane of symmetry of the bearing 17 radial to axis A.

Furthermore, outer ring 30 is fastened on the tubular body 40 of the control element 16 on the opposite side to flange 42 in a direction radial to axis A.

The anti-torque rotor 4 also comprises a further motive power (anti-torque rotor) transmission unit 45 operatively connected to the rod 10 and to the control element 16.

Anti-torque rotor transmission unit 45 is available:

in an active configuration, in which it causes the control element 16 to slide along axis A, following the translation of said rod 10 along axis A; or in an inactive configuration, in which it is disengaged from the control element 16.

In greater detail, anti-torque rotor transmission unit 45 is set in the active configuration in the event of failure of the bearing 17.

Hereinafter in this description, the term "failure" of the bearing 17 means any operating condition in which the bearing 17 is no longer able to transmit an axial load from the rod 10 to the control element 16, i.e. to cause the axial translation in both directions of the control element 16, following the axial translation of the rod 10.

By way of non-limitative example, a first "failure" operating condition occurs when inner ring 31 of the bearing 17 is driven in rotation by the rolling bodies 32 and, due to friction, generates a twisting moment on the rod 10.

A second "failure" operating condition occurs when the rolling bodies 32 of the bearing 17 breaks, so that the rod 10 becomes axially movable with respect to the control element 16.

Otherwise, the anti-torque rotor transmission unit 45 is set in the inactive configuration when the bearing 17 correctly allows the relative rotation of the control element 16 with respect to the rod 10 and prevents any relative translation between the control element 16 and the rod 10.

The anti-torque rotor 4 also comprises detection means 50, which comprise:

a sensor 51 adapted to generate a first signal associated with the failure of the bearing 17; and/or a sensor 52 adapted to generate a second signal associated with the anti-torque rotor transmission unit 45 being in the active configuration.

Anti-torque rotor transmission unit 45 basically comprises (FIGS. 4 and 5):

a cylindrical body 60, a nut in the case shown, integral with the rod 10 and comprising an annular ridge 61 projecting radially from the side opposite to the rod 10; and a ring 63 integral with the control element 16 and provided with a seat 64 open towards axis A and engaged by the ridge 61.

The ridge 61 is delimited in the axial direction by two walls 65 and 66 opposite to each other.

In the case shown, the ridge 61 has a trapezoidal profile and comprises a further wall 67 axially interposed between walls 65 and 66. In particular, wall 67 extends parallel to axis A.

In particular, walls 65 and 66 are inclined to one another with respect to axis A, lying on respective planes converging on the opposite side of axis A with respect to the rod 10, and extend symmetrically with respect to a plane radial to axis A.

Seat 64 is delimited in the axial direction by two walls 71 and 72 opposite to each other.

In the case shown, seat 64 also has a trapezoidal profile and comprises a further wall 73 axially interposed between walls 71 and 72. In particular, wall 73 extends parallel to axis A.

Similarly to walls 65 and 66, walls 71 and 72 are inclined to one another with respect to axis A, lying on respective planes converging on the opposite side of axis A with respect to the rod 10, and extending symmetrically with respect to a plane radial to axis A.

The ridge 61 engages the seat 64 with axial and radial play with respect to axis A.

Figure 5:
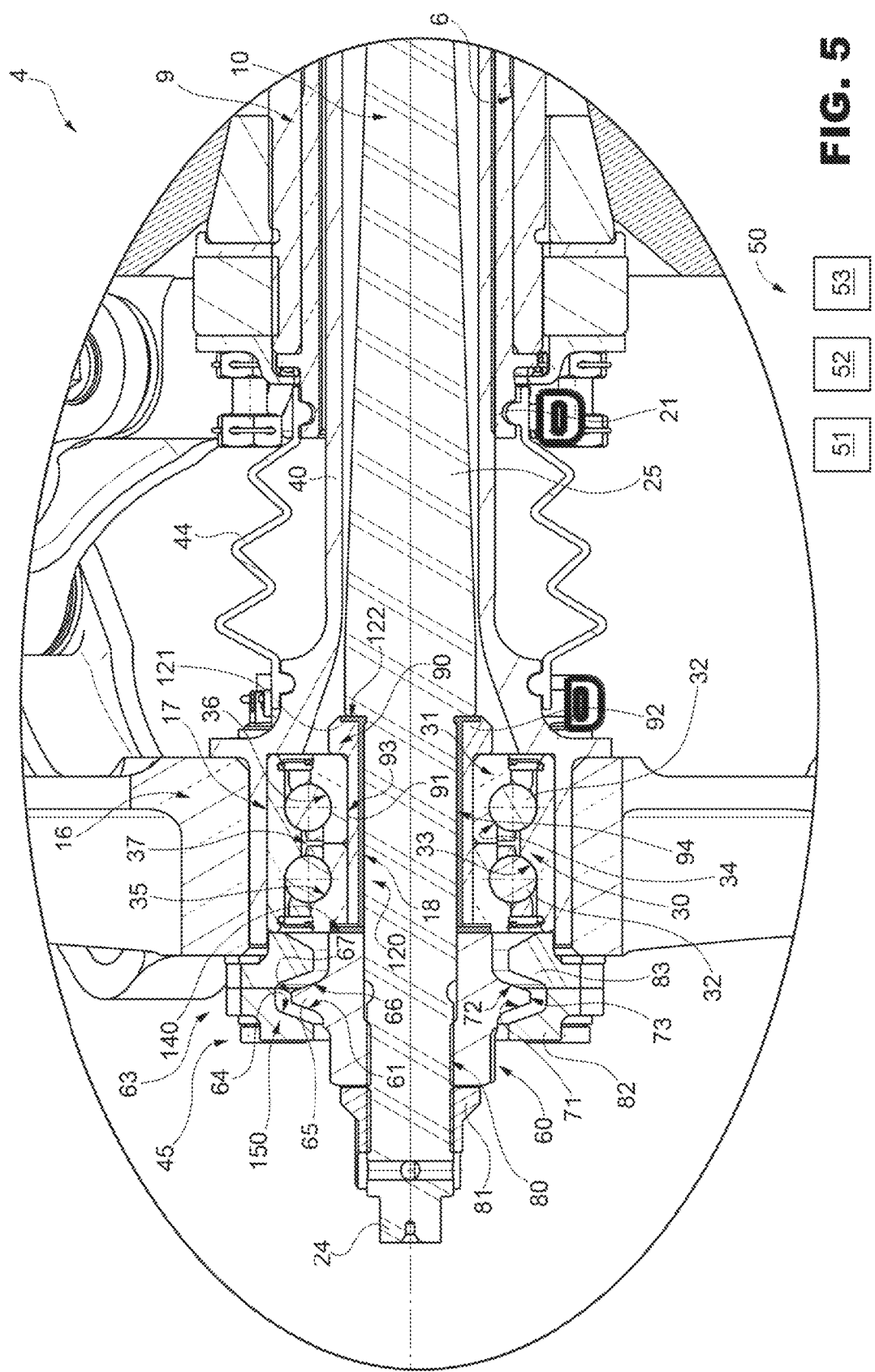
FIG. 5 is an enlarged view of certain details in FIG. 4.

More specifically, when the anti-torque rotor transmission unit 45 is set in the inactive configuration, the ridge 61 is axially set apart from seat 64, i.e. both walls 66 and 67 of the ridge 61 are set apart from the respective walls 71 and 72 of the seat 64, as shown in FIG. 5.

Contrariwise, when anti-torque rotor transmission unit 45 is set in the active configuration, the ridge 61 makes axial contact with the seat 64. More specifically, wall 71 makes contact with wall 65, or wall 72 makes contact with wall 66, ensuring that the sliding of the rod 10 in both directions parallel to axis A causes the control element 16 to slide in both directions.

Furthermore, wall 73 of the seat 64 is radially set apart from wall 67 of the ridge 61.

In particular, the cylindrical body 60 is connected to the rod 10 by a threaded connection 80.

Anti-torque rotor transmission unit 45 also comprises a lock nut 81, which is screwed onto the rod 10 and is arranged in axial abutment against the cylindrical body 60 on the end axially opposite to the bearing 17.

In particular, the lock nut 81 is screwed on end 24 of the rod 10.

Ring 63 is formed by two half-rings 82 and 83, which are in axial contact with each other.

More specifically, half-ring 83 is axially interposed between half-ring 82 and the bearing 17.

Half-ring 83 is also in axial contact with the bearing 17.

The half-rings 82 and 83 define respective portions of the seat 64.

In particular, the ridge 61 and the seat 64 are coated with a low friction material 150.

More specifically, wall 71 makes contact with wall 65, or wall 72 makes contact with wall 66.

Preferably, the anti-torque rotor 4 also comprises a sleeve 90, radially interposed between ring 31 and the rod 10, and axially interposed between the rod 10 and the cylindrical body 60.

In greater detail, the sleeve 90 extend coaxially to the rod 10.

The sleeve 90 basically comprises:
a main body 91; and
an axial end ridge 92, which has a diameter greater than the main body 91 and projects radially from the main body 91 towards the control element 16 from the side opposite to axis A.

In greater detail, the main body 91 comprises:
a radially outer surface 93 that makes contact with ring 31 of the bearing 17; and
a radially inner surface 94 that makes contact with a surface 18 of the rod 10 radially external with respect to axis A.

The ridge 92 defines an axial end of the sleeve 90 facing towards end 23 of the rod 10 and arranged in abutment against an annular shoulder 121 of the rod 10.

The cylindrical body 60 also comprises an end surface 140, extending radially and arranged in contact with ring 31.

The anti-torque rotor 4 comprises an interface 120 made of an antifriction material interposed between the rod 10 and the bearing 17, so as to allow rotation of the entire bearing 17 with respect to the rod 10 about axis A, in the event of failure of the bearing 17.

The interface 120 comprises a first coating in an antifriction material extending axially and arranged on the surface 94 of the sleeve 90 and on surface 18 of the rod 10.

The interface 120 also comprises a second coating extending radially on shoulder 121 and on surface 122 of the ridge 92 in contact with shoulder 121 and axially opposite to ring 31 of the bearing 17.

The interface 120 is adapted to prevent undesired rotation of the rod 10 about axis A. This undesired rotation could occur if, following a failure condition of the bearing 17, the rolling bodies 32 transmit a twisting moment to ring 31, and consequently, by friction, to the sleeve 90.

In the case shown, the sleeve 90 is made of steel and surfaces 93 are 94 are coated with a hard tungsten oxide.

Alternatively, the sleeve 90 is made of bronze and has a structure with cavities that entrap lubricant.

The material of surface 18 and surfaces 93 and 94 has a coefficient of friction such as to avoid, in the aforementioned failure condition, the undesired rotation of the sleeve 90 transmitting a twisting moment to the rod 10 sufficient to cause undesired rotation of the rod 10.

The interface 120 also comprises a third coating deposited on surface 140 in contact with ring 31 of the bearing 17.

Ring 30 of the bearing 17 is axially secured, by respective parts axially opposite to each other, between the tubular body 40 of the control element 16 and ring 63.

Ring 31 of the bearing 17 is axially secured, by respective parts axially opposite to each other, between the ridge 92 of the sleeve 90 and the cylindrical body 60.

The detection means 50 also comprise a sensor 53 adapted to generate a third signal associated with the rotation of the sleeve 90 about axis A.

Furthermore, the sensor 51 is adapted to detect at least one of the temperature and acceleration of the bearing 17 and/or the sleeve 90.

In use, operation of main rotor 3 generates thrust that enables sustaining the helicopter 1 in the air and forward flight of the helicopter 1.

Operation of main rotor 3 also generates torque on the fuselage 2 that is balanced by the counter-torque generated by the thrust of anti-torque rotor 4.

In order to control the yaw angle of the helicopter 1, the pilot operates flight control 15, so as to adjust the pitch of the blades 8 of anti-torque rotor 4, and consequently the thrust generated by anti-torque rotor 4.

During operation of anti-torque rotor 4, the mast 6 is driven in rotation about axis A by the shaft 13 and drives the hub 9, the control element 16 and the blades 8 in rotation about axis A. The rod 10, instead, remains angularly fixed with respect to axis A.

The operation of anti-torque rotor 4 is described below, starting from a condition in which the bearing 17 works correctly and anti-torque rotor transmission unit 45 is consequently set in the inactive configuration.

In this condition, operation of flight control 15 causes translation of the rod 10 in a given direction along axis A.

This translation causes integral translation of the bearing 17 and the control element 16 along axis A.

In consequence, the control element 16 moves away from (or closer to) the blades 8 and changes the inclination of the levers 43 with respect to axis B, increasing (or decreasing) the angle of attack of the blades 18.

This movement of the levers 43 causes the simultaneous rotation by equal angles of the blades 8 about the associated axes B and the consequent adjustment of the angles of attack of the blades 8.

If, following failure of the bearing 17, the rolling bodies 32 improperly transfer a twisting moment to ring 31, and therefore to the sleeve 90, the first and second coatings of the interface 120 prevent the rod 10 from being driven in rotation.

More specifically, the antifriction material, of surfaces 94 and 18 forming the first coating and of surface 122 and shoulder 121 forming the second coating, prevents the undesired rotation of the sleeve 90 from transmitting a twisting moment to the rod 10 sufficient to cause undesired rotation of the rod 10.

The antifriction material of the third coating of the interface 120 deposited on surface 140 prevents undesired rotation of ring 31 of the bearing 17 from causing undesired rotation of ring 63 and the rod 10.

In the event of undesired rotation of the sleeve 90, sensor 53 generates the third signal, which informs the pilot of the hazard condition.

In addition, sensor 51 detects the temperature and acceleration of the bearing 17 and of sleeve 90 and, in cases where these values implicate a failure state of the bearing 17, generates the first signal.

Furthermore, in the above-described condition, walls 65 and 66 of the ridge 61 are axially set apart from the respective walls 71 and 72 of the seat 64, as shown in FIG. 5.

In consequence, the anti-torque rotor transmission unit 45 formed by the cylindrical body 60 and ring 63 does not perform an active role in the transmission of movement from the rod 10 to the control element 16.

In the event of failure, the bearing 17 is no longer able to transmit an axial load from the rod 10 to the control element 16, i.e. to cause integral translation of the rod 10 and the control element 16 parallel to axis A.

In this situation, anti-torque rotor transmission unit 45 is activated, which enables preserving controllability of the anti-torque rotor 4, at least for a predetermined period of time.

In greater detail, operation of flight control 15 causes translation of the rod 10 and ring 63 up to a position where the ridge 61 makes axial contact with the seat 64 of ring 63.

More specifically, wall 65 (66) of the ridge 61 first makes contact with and then axially pushes wall 71 (72) of the seat 64 of ring 63.

In this way, the anti-torque rotor transmission unit 45 is in the active configuration, and translation of the rod 10 continues to cause the translation of the control element 16, via the cylindrical body 60 and ring 63.

Activation of anti-torque rotor transmission unit 45 generates a small amount of play on the control element 16 corresponding to the over-travel that the rod 10 must cover to bring the ridge 61 into abutment against the seat 64.

Sensor 52 generates the second signal, which informs the pilot that anti-torque rotor transmission unit 45 is in the active configuration.

Figure 6:
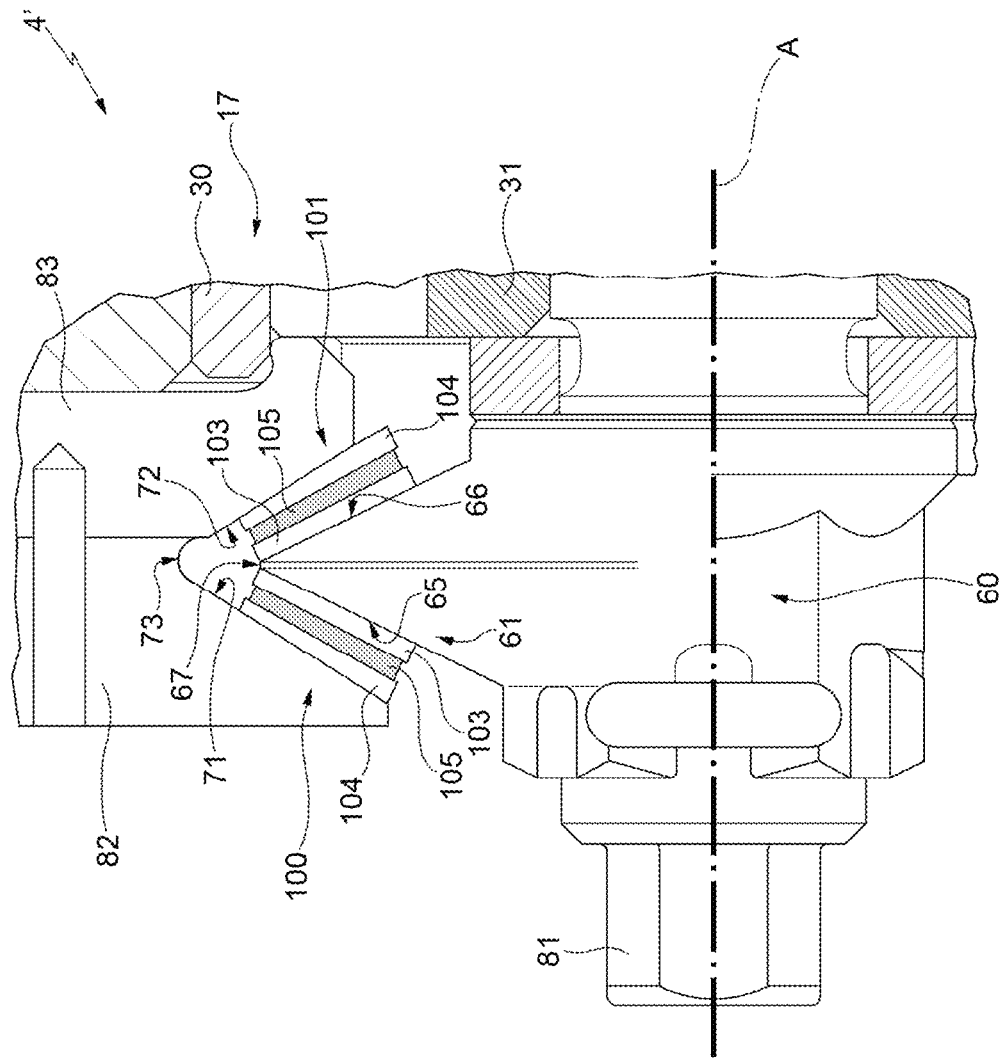
FIG. 6 shows, on a highly enlarged scale, further details of a second embodiment of the anti-torque rotor in FIGS. 1 to 5.

Referring to FIG. 6, reference numeral 4' indicates an anti-torque rotor according to a second embodiment of the present invention.

Anti-torque rotor 4' is similar to anti-torque rotor 4 and will be described below only with regard to the differences from the latter; where possible, identical or equivalent parts of anti-torque rotors 4 and 4' will be indicated with the same reference numerals.

In particular, anti-torque rotor 4' differs from anti-torque rotor 4 in that, in order to reduce friction between the ridge 61 and the seat 64, it comprises:
a bearing 100 interposed between wall 65 of ridge 61 and wall 71 of the seat 64; and
a bearing 101 interposed between wall 66 of the ridge 61 and wall 72 of the seat 64.

Preferably, the bearings 100 and 101 are roller or ball or needle bearings.

In particular, each bearing 100 (101) comprises:
a ring 103 fastened to wall 66 (67);
a ring 104 fastened to wall 71 (72); and
a plurality of rolling bodies 105, which are interposed between the rings 103 and 104.

In the case shown, the rings 103 and 104 are of a truncated-cone type.

In the case shown, the rolling bodies 105 are needles having respective axes inclined with respect to axis A.

The operation of anti-torque rotor 4' is similar to that of anti-torque rotor 4 and is therefore not described in detail.

From examination of the characteristics of the anti-torque rotors 4 and 4' according to the present invention, the advantages that can be achieved therewith are evident.

If the rolling bodies 32 improperly transmit a twisting moment to ring 31 and the sleeve 90, causing them to rotate following failure of the bearing 17, the interface 102 in antifriction material substantially limits the risk of this twisting moment being transmitted to the rod 10.

In this way, the risk that the rod 10 becomes damaged by this twisting moment and that anti-torque rotor 4 or 4' consequently becomes uncontrollable is substantially limited, without adding further bearings, unlike the solutions of known type mentioned in the introductory part of this description.

Sensor 53 generates the third signal, which informs the pilot of the hazard condition and that it is advisable to land as soon as possible.

In particular, when set in the active configuration, anti-torque rotor transmission unit 45 causes the control element 16 to slide, following the translation of the rod 10 parallel to axis A.

Due to this, anti-torque rotor transmission unit 45 defines an additional and redundant transmission path of control from the rod 10 to the control element 16 with respect to the bearing 17.

In this way, anti-torque rotor transmission unit 45 ensures controllability of the angle of attack of the blades 8, even in the event of failure of the bearing 17.

More specifically, in the case of damage to the rolling bodies 32 that results in physical separation of rings 31 and 30, the translation of the rod 10 brings the ridge 61 into abutment against the seat 64. In this way, the correct translation of the control element 16 and the consequent controllability of the angle of attack of the blades 8 and the rotor 4 are ensured.

Once the ridge 61 is in abutment against the seat 64, sensor 52 generates the second signal, which informs the pilot that anti-torque rotor transmission unit 45 is in the active configuration. In this way, the pilot is informed that it is advisable to land as soon as possible.

Finally, it is clear that modifications and variants can be made with regard to the anti-torque rotors 4 and 4' described and illustrated herein without departing from the scope defined by the claims.

In particular, the interface 102 could comprise only one or two of the first, second and third coatings.

The invention claimed is:

1. An anti-torque rotor (4, 4') for a helicopter (1), comprising:
a mast (6), rotatable about a first axis (A);
a plurality of blades (8), hinged on said mast (6), extending along respective second axes (B) transversal to said first axis (A) and rotatable about respective said second axes (B) to alter the respective angles of attack;
a control element (16), sliding along said first axis (A) with respect to said mast (6), integrally rotating with said mast (6), and operatively connected to said blades (8) to cause the rotation of said blades (8) about respective said second axes (B) following a translation of said control element (16) along said axis (A);

a control rod (10), sliding axially along said first axis (A) with respect to said mast (6) and angularly fixed with respect to said first axis (A); and a bearing (17), interposed between said control rod (10) and said control element (16), sliding along said first axis (A) with respect to said mast (6) and integrally with said control rod (10), and configured to enable the relative rotation of said control element (16) with respect to said control rod (10) about said first axis (A) in a correct operating condition;

said anti-torque rotor (4, 4') further comprising:

an interface (120) made of an antifriction material interposed between said control rod (10) and said bearing (17), so as to enable the rotation of said bearing (17) with respect to said control rod (10) about said first axis (A) in the event of failure of said bearing (17); and a sleeve (90) radially interposed between said control rod (10) and said bearing (17), and axially sliding integrally with said control rod (10) and said bearing (17);

said interface (120) comprising at least a first surface (94) of said sleeve (90), which is arranged in contact with said control rod (10), so as to enable the rotation of said sleeve (90) jointly with said bearing (17), with respect to said control rod (10);

said anti-torque rotor (4, 4') further comprising at least a first sensor (53) adapted to detect the rotation of said sleeve (90);

said bearing (17) comprising:

an outer ring (30) integrally rotating with said control element (16) about said first axis (A);

an inner ring (31) radially internal to said outer ring (30) with respect to said first axis (A) and integrally sliding with said control rod (10) along said first axis (A); and a plurality of rolling bodies (32), which are interposed between said outer and inner rings (30, 31) and adapted to roll on respective raceways (33, 34) of said outer and inner rings (30, 31);

said inner ring (31) being in contact with said sleeve (90) on the side opposite to said rolling bodies (32) along a direction radial to said first axis (A);

said anti-torque rotor (4, 4') further comprising an anti-torque rotor transmission unit (45), which is operatively connected to said control rod (10) and to said control element (16);

said anti-torque rotor transmission unit (45) being configured to operate:

in an active configuration, causing said control element (16) to slide, following the translation of said control rod (10), along said first axis (A); or in an inactive configuration, wherein the anti-torque rotor transmission unit (45) is disengaged from said control element (16);

wherein said anti-torque rotor transmission unit (45) being arranged in said active configuration in case of failure of the bearing (17), wherein said bearing (17) is no longer able to transmit an axial load from said control rod (10) to said control element (16), causing the axial translation in both directions of said control element (16), following the axial translation of said control rod (10);

and said anti-torque rotor transmission unit (45) being arranged in said inactive configuration when said bearing (17) correctly allows relative rotation of said control element (16) with respect to said control rod (10) and prevents any relative translation between said control element (16) and said control rod (10);

wherein said anti-torque rotor (4, 4') further comprises a second sensor (52) adapted to generate a signal associated with the fact of said anti-torque rotor transmission unit (45) being in said active configuration.

2. A rotor according to claim 1, characterized in that said interface (120) comprises the entire said sleeve (90).

3. A rotor according to claim 1, characterized in that said interface (120) comprises a second surface (18) of said control rod (10) having an axial extension and arranged in contact with said first surface (94).

4. A rotor according to claim 1, characterized in that said sleeve (90), in turn, comprises:

a first main body (91) radially interposed between said bearing (17) and said control rod (10); and an axial end ridge (92), which radially projects from said first main body (91) towards said bearing (17).

5. A rotor according to claim 4, characterized in that said interface (120) further comprises a third surface (122) of said axial end ridge (92) arranged in abutment against a shoulder (121) of said control rod (10).

6. A rotor according to claim 5, characterized in that said interface (120) further comprises said shoulder (121) of said control rod (10) in contact with said third surface (122).

7. A rotor according to claim 1, characterized in that said anti-torque rotor transmission unit (45), in turn, comprises:

an annular ridge (61), axially integral with said control rod (10) and radially projecting from said control rod (10); and a seat (64) engaged by said annular ridge (61) and angularly integral with said control element (16).

8. A rotor according to claim 7, characterized in that said anti-torque rotor transmission unit (45) comprises a cylindrical body sleeve (60) mounted coaxially on said control rod (10) and from which said annular ridge (61) projects from the side radially opposite to said control rod (10);

said inner ring (31) being axially blocked between said cylindrical body (60) and said radially projecting axial end ridge (92) of said sleeve (90);

said interface (120) comprising a fourth surface (140) of said cylindrical body (60) arranged in contact with said inner ring (31).

9. An anti-torque rotor (4, 4') for a helicopter (1), comprising:

a mast (6), rotatable about a first axis (A);

a plurality of blades (8), hinged on said mast (6), extending along respective second axes (B) transversal to said first axis (A) and rotatable about respective said second axes (B) to alter the respective angles of attack;

a control element (16), sliding along said first axis (A) with respect to said mast (6), integrally rotating with said mast (6), and operatively connected to said blades (8) to cause the rotation of said blades (8) about respective said second axes (B) following a translation of said control element (16) along said axis (A);

a control rod (10), sliding axially along said first axis (A) with respect to said mast (6) and angularly fixed with respect to said first axis (A); and a bearing (17), interposed between said control rod (10) and said control element (16), sliding along said first axis (A) with respect to said mast (6) and integrally with said control rod (10), and configured to enable the relative rotation of said control element (16) with respect to said control rod (10) about said first axis (A) in a correct operating condition;

an interface (120) made of an antifriction material interposed between said control rod (10) and said bearing (17), so as to enable the rotation of said bearing (17)

with respect to said control rod (10) about said first axis (A) in the event of failure of said bearing (17); and a sleeve (90) radially interposed between said control rod (10) and said bearing (17), and axially sliding integrally with said control rod (10) and said bearing (17);

said interface (120) comprising at least a first surface (94) of said sleeve (90), which is arranged is contact with said control rod (10), so as to enable the rotation of said sleeve (90) jointly with said bearing (17), with respect to said control rod (10);

said anti-torque rotor (4, 4') further comprising at least a first sensor (53) adapted to detect the rotation of said sleeve (90);

said sleeve (90), in turn, comprises:
 a first main body (91) radially interposed between said bearing (17) and said control rod (10); and
 an axial end ridge (92), which radially projects from said first main body (91) towards said bearing (17);

characterized in that said interface (120) further comprises a third surface (122) of said axial end ridge (92) arranged in abutment against a shoulder (121) of said control rod (10);

said interface (120) further comprising said shoulder (121) of said control rod (10) in contact with said third surface (122).

10. A rotor according to claim 9, characterized in that said bearing (17) comprises:
 an outer ring (30) integrally rotating with said control element (16) about said first axis (A);
 an inner ring (31) radially internal to said outer ring (30) with respect to said first axis (A) and integrally sliding with said control rod (10) along said first axis (A); and
 a plurality of rolling bodies (32), which are interposed between said outer and inner rings (30, 31) and adapted to roll on respective raceways (33, 34) of said outer and inner rings (30, 31);

said inner ring (31) being in contact with said sleeve (90) on the side opposite to said rolling bodies (32) along a direction radial to said first axis (A).

11. A rotor according to claim 10, further comprising an anti-torque rotor transmission unit (45), which is operatively connected to said control rod (10) and to said control element (16);

said anti-torque rotor transmission unit (45) being configured to operate:
 in an active configuration, causing said control element (16) to slide, following the translation of said control element (16), along said first axis (A); or
 in an inactive configuration, wherein the anti-torque rotor transmission unit (45) is disengaged from said control element (16);

wherein said anti-torque rotor transmission unit (45) being arranged in said active configuration in case of failure of the bearing (17), wherein said bearing (17) is no longer able to transmit an axial load from said control rod (10) to said control element (16), causing the axial translation in both directions of said control element (16), following the axial translation of said control rod (10);

and said anti-torque rotor transmission unit (45) being arranged in said inactive configuration when said bearing (17) correctly allows relative rotation of said control element (16) with respect to said rod (10) and prevents any relative translation between said control element (16) and said control rod (10).

12. A rotor according to claim 10, further comprising a second sensor (52) adapted to generate a signal associated with the fact of said anti-torque rotor transmission unit (45) being in said active configuration.

13. A rotor according to claim 11, characterized in that said anti-torque rotor transmission unit (45), in turn, comprises:
 an annular ridge (61), axially integral with said control rod (10) and radially projecting from said control rod (10); and
 a seat (64) engaged by said annular ridge (61) and angularly integral with said control element (16).

14. A rotor according to claim 13, characterized in that said anti-torque rotor transmission unit (45) comprises a cylindrical body (60) mounted coaxially on said control rod (10) and from which said annular ridge (61) projects from the side radially opposite to said control rod (10);

said inner ring (31) being axially blocked between said cylindrical body (60) and said radially projecting axial end ridge (92) of said sleeve (90);

said interface (120) comprising a fourth surface (140) of said cylindrical body (60) arranged in contact with said inner ring (31).

15. A helicopter comprising:
a fuselage (2);
a main rotor (3); and
an anti-torque rotor (4, 4') according to claim 1.

16. An anti-torque rotor (4, 4') for a helicopter (1), comprising:
 a mast (6), rotatable about a first axis (A);
 a plurality of blades (8), hinged on said mast (6), extending along respective second axes (B) transversal to said first axis (A) and rotatable about respective said second axes (B) to alter the respective angles of attack;
 a control element (16), sliding along said first axis (A) with respect to said mast (6), integrally rotating with said mast (6), and operatively connected to said blades (8) to cause the rotation of said blades (8) about respective said second axes (B) following a translation of said control element (16) along said axis (A);
 a control rod (10), sliding axially along said first axis (A) with respect to said mast (6) and angularly fixed with respect to said first axis (A); and
 a bearing (17), interposed between said control rod (10) and said control element (16), sliding along said first axis (A) with respect to said mast (6) and integrally with said control rod (10), and configured to enable the relative rotation of said control element (16) with respect to said control rod (10) about said first axis (A) in a correct operating condition;

said anti-torque rotor (4, 4') further comprising:
 an interface (120) made of an antifriction material interposed between said control rod (10) and said bearing (17), so as to enable the rotation of said bearing (17) with respect to said control rod (10) about said first axis (A) in the event of failure of said bearing (17); and
 a sleeve (90) radially interposed between said control rod (10) and said bearing (17), and axially sliding integrally with said control rod (10) and said connection element (17);

said interface (120) comprising at least a first surface (94) of said sleeve (90), which is arranged is contact with said control rod (10), so as to enable the rotation of said sleeve (90) jointly with said bearing (17), with respect to said control rod (10);

said anti-torque rotor (4, 4') further comprising at least a first sensor (53) adapted to detect the rotation of said sleeve (90);

said bearing (17) comprising:
 an outer ring (30) integrally rotating with said control element (16) about said first axis (A);

an inner ring (31) radially internal to said outer ring (30) with respect to said first axis (A) and integrally sliding with said control rod (10) along said first axis (A); and a plurality of rolling bodies (32), which are interposed between said outer and inner rings (30, 31) and adapted to roll on respective raceways (33, 34) of said outer and inner rings (30, 31);

said inner ring (31) being in contact with said sleeve (90) on the side opposite to said rolling bodies (32) along a direction radial to said first axis (A);

said anti-torque rotor (4, 4') further comprising an anti-torque rotor transmission unit (45), which is operatively connected to said control rod (10) and to said control element (16);

said anti-torque rotor transmission unit (45) being configured to operate:

in an active configuration, causing said control element (16) to slide, following the translation of said control element (16), along said first axis (A); or in an inactive configuration, wherein the anti-torque rotor transmission unit (45) is disengaged from said control element (16);

wherein said anti-torque rotor transmission unit (45) being arranged in said active configuration in case of failure of the bearing (17), wherein said bearing (17) is no longer able to transmit an axial load from said control rod (10) to said control element (16), causing the axial translation in both directions of said control element (16), following the axial translation of said control rod (10);

and said anti-torque rotor transmission unit (45) being arranged in said inactive configuration when said first bearing (17) correctly allows relative rotation of said control element (16) with respect to said control rod (10) and prevents any relative translation between said control element (16) and said rod (10);

said interface (120) comprising the entire said sleeve (90);

said anti-torque rotor transmission unit (45), in turn, comprising:

an annular ridge (61), axially integral with said control rod (10) and radially projecting from said control rod (10); and a seat (64) engaged by said annular ridge (61) and angularly integral with said control element (16);

said sleeve (90), in turn, comprises:

a first main body (91) radially interposed between said bearing (17) and said control rod (10); and an axial end ridge (92), which radially projects from said first main body (91) towards said bearing (17);

characterized in that said anti-torque rotor transmission unit (45) comprises a cylindrical body (60) mounted coaxially on said control rod (10) and from which said annular ridge (61) projects from the side radially opposite to said control rod (10);

said inner ring (31) being axially blocked between said cylindrical body (60) and said radially projecting axial end ridge (92) of said sleeve (90);

said interface (120) comprising a fourth surface (140) of said cylindrical body (60) arranged in contact with said inner ring (31).

* * * * *